(Model.)

4 Sheets—Sheet 1.

G. D. HAWORTH.
Corn Planter.

No. 243,041.　　　　　　　　　Patented June 14, 1881.

Witnesses:
Franck L. Durand
W. E. Chaffee

Inventor,
George D. Haworth,
by Sell, Smith & Co,
Attorneys (Model.)  4 Sheets—Sheet 2.
G. D. HAWORTH.
Corn Planter.
No. 243,041.  Patented June 14, 1881.
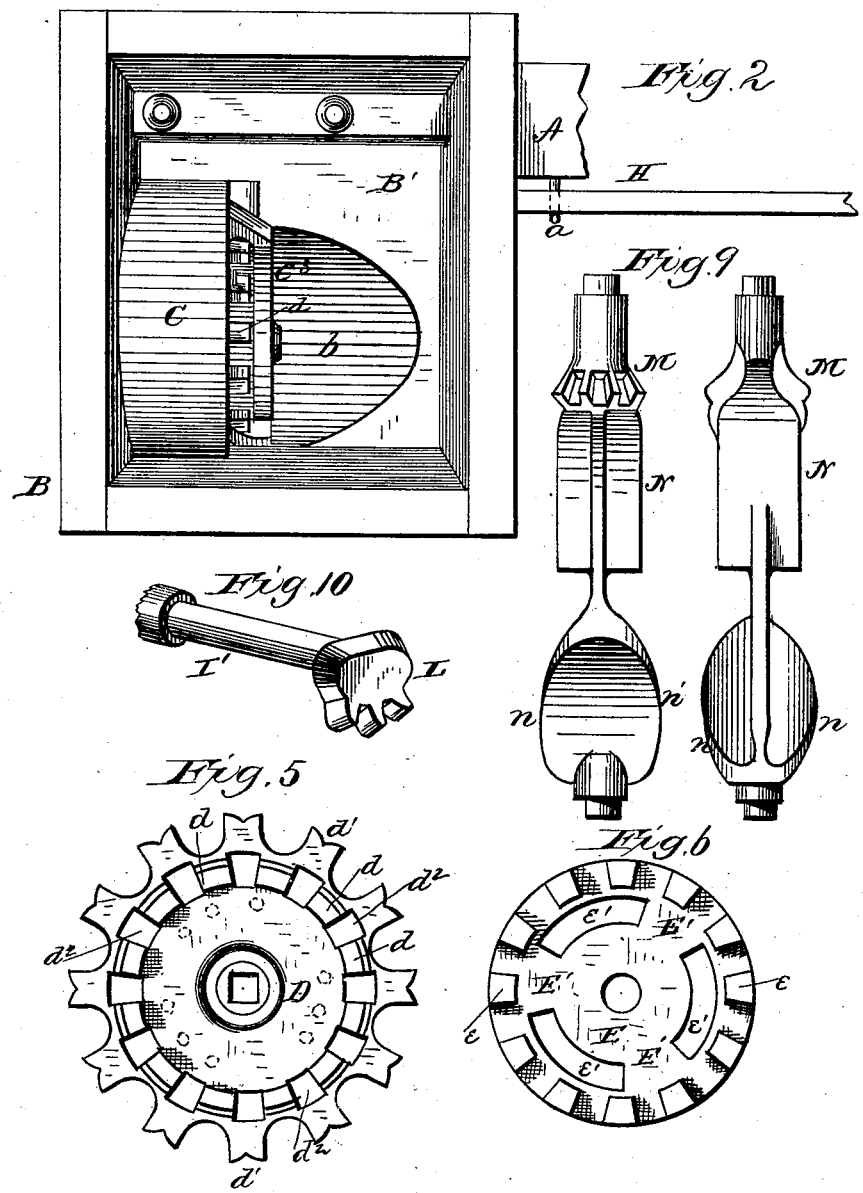
Witnesses.
Franck L. Durand
W. C. Chaffee
Inventor,
George D. Haworth,
by A. M. Smith & Co,
Attorneys (Model.)  4 Sheets—Sheet 3.

G. D. HAWORTH.
Corn Planter.

No. 243,041. Patented June 14, 1881.

Witnesses
Franck L. Ourand
W. E. Chaffee

Inventor
George D. Haworth,
by A. M. Smith & Co.
Attorneys

N. PETERS, Photo-Lithographer, Washington, D. C.

(Model.)

4 Sheets—Sheet 4.

G. D. HAWORTH.
Corn Planter.

No. 243,041. Patented June 14, 1881.

Witnesses
Franck L. Ouraud
N. W. Chaffee

Inventor,
George D. Haworth,
by A. M. Smith & Co.
Attorneys

UNITED STATES PATENT OFFICE.

GEORGE D. HAWORTH, OF DECATUR, ILLINOIS.

CORN-PLANTER.

SPECIFICATION forming part of Letters Patent No. 243,041, dated June 14, 1881.

Application filed April 15, 1881. (Model.)

*To all whom it may concern:*

Figure 1:
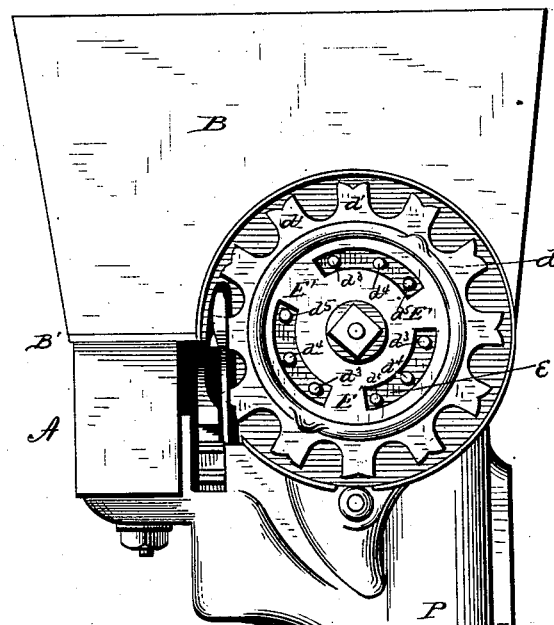
Figure 8:
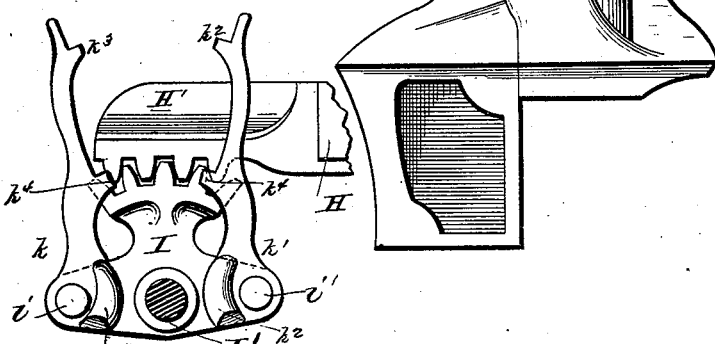
Figure 3:
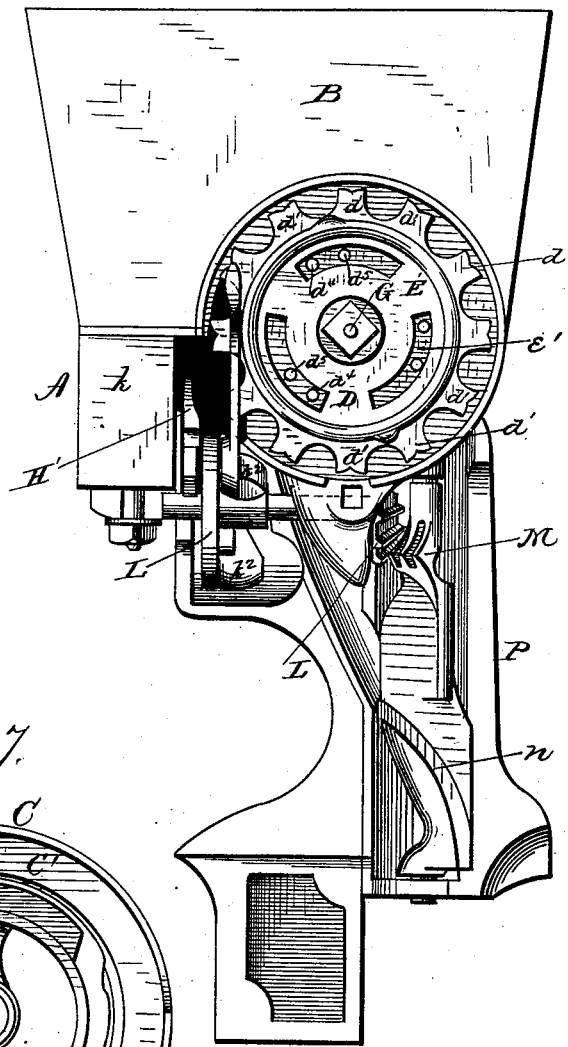
Figure 7:
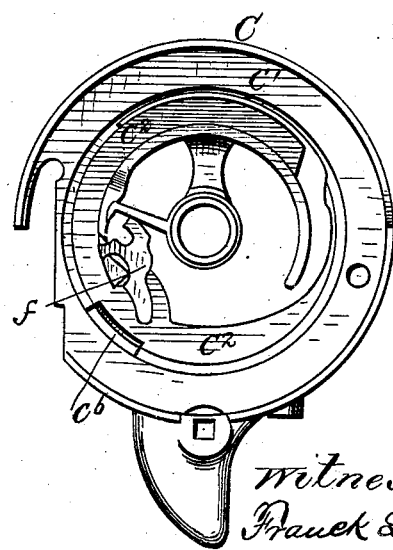
Figure 4:
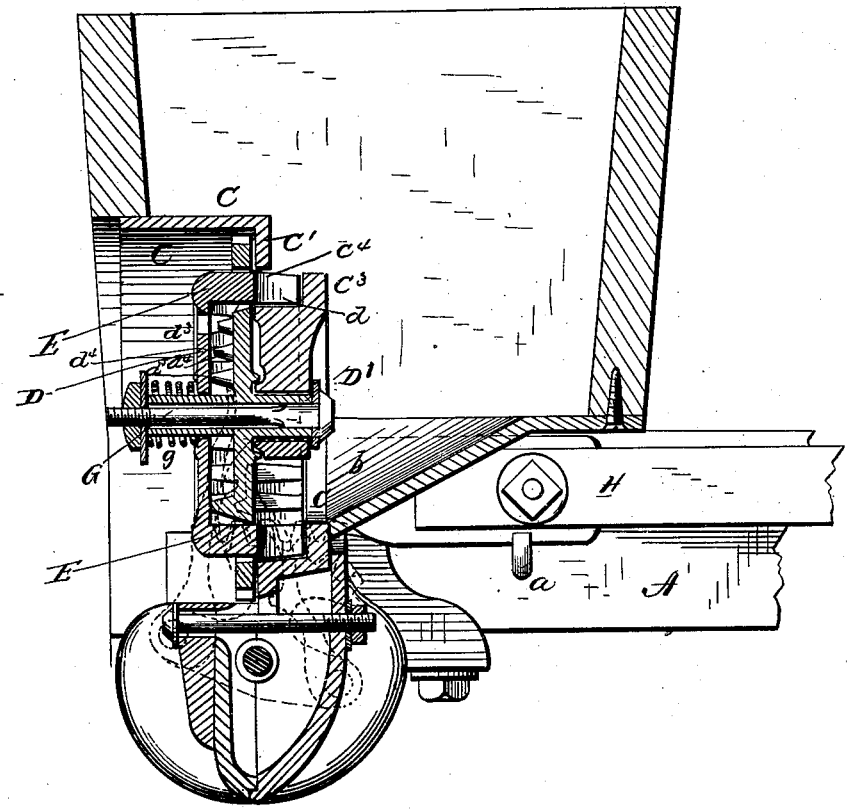
Figure 11:
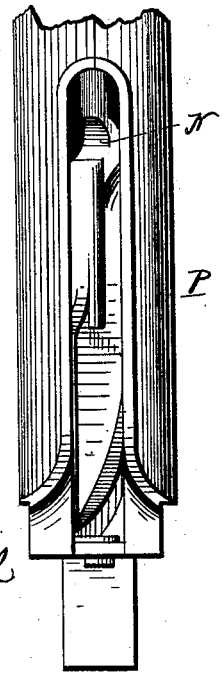

Be it known that I, GEORGE D. HAWORTH, of Decatur, county of Macon, State of Illinois, have invented certain new and useful Improvements in Corn-Planters, of which the following is a full, clear, and exact description, reference being had to the accompanying drawings, making part of this specification, in which—
Figure 1 is a side elevation of the seed-hopper and the shoe or feed-spout connected therewith. Fig. 2 is a plan view of the same. Fig. 3 is a view similar to Fig. 1, with the outer half of the feed spout or conductor removed to show the lower seed-drop and the arrangement of parts for operating the same. Fig. 4 represents a vertical transverse section through Fig. 1. Fig. 5 is an inner face view of the seed-wheel. Fig. 6 is a similar view of the adjustable toothed disk for regulating the size of the feed-measuring cups or chambers. Fig. 7 is an outer face view of the shell or casing of the distributing-wheel. Fig. 8 is a front elevation of the rack-segment and pawls actuating the feed-wheel. Fig. 9 shows the lower seed-drop shaft in front and rear elevations. Fig. 10 is a perspective view of the segment and a part of the shaft for actuating the lower drop; and Fig. 11 is a rear view of the lower part of the seed spout or conductor, showing the lower seed-drop.

The invention relates, first, to a novel construction of the distributing and measuring wheel and its casing, whereby the measuring cups or chambers are exposed or opened to the action of the seed in the hopper, first upon one side, and then, by the revolution of the wheel within the casing, upon the other side, thereby facilitating and insuring their being evenly filled; secondly, to a novel construction and arrangement of gaging disk or wheel, in connection with the distributing-wheel, whereby the size of the measuring cups or chambers in the latter may be uniformly increased or diminished to conform to the number of grains and the size of the corn or seed to be operated upon; thirdly, to a novel arrangement of rack, pinion, and pawls for actuating the seeding-wheel, and for locking the latter at the end of each throw or intermittent movement; fourthly, to the manner of actuating the upright shaft forming the lower drop by beveled segments connecting said shaft with the shaft carrying the segment through which the seeding-wheel is operated; and, finally, to certain details of construction and arrangements of parts hereinafter fully explained.

In the accompanying drawings only so much of a corn-planter is shown as is necessary to an understanding of my improvements in the seeding devices referred to, as the other parts of the machine may be of any usual or preferred construction and arrangement, and while the improvements herein described are designed with especial reference to their use in what is known as a "check-row corn-planter," it will be obvious that they may be used in other forms of seeding-machines.

In the drawings, A represents a transverse bar of the main or truck frame, upon each end of which, in practice, in a corn-planter, is secured a hopper, B, provided, preferably, with a metal bottom, B', having a concavity or depression at $b$, with side walls converging toward and terminating in contact with the vertical inner face or wall of the distributer-wheel casing C. The form of this casing is shown in Fig. 7, (in connection with the plan and sectional views, Figs. 2 and 4,) being in the main cylindrical, surrounding the seeding-wheel, and provided with an inner end wall, C', having an annular groove at $C^2$, in which inwardly-projecting teeth on the seeding disk or wheel move. The portion of the end wall, C', surrounded by the groove $C^2$ is made thicker, as shown at $C^3$, and has a bearing formed in it for the shaft D' of the seeding-wheel D, below which said end wall is cut away in a curved line, conforming substantially to the lower discharging end of the depression or concavity $b$ in the hopper-bottom, and the upper portion of the outer wall of the annular groove $C^2$ is also cut away, as shown at $C^4$ in Fig. 4, so as to expose the teeth $d$ and open the measuring-chamber between them from their outer side within the hopper, after which the seed carried between said teeth and upon or between the inner and outer walls of the groove $C^2$ is carried to the lower wall of the casing-groove, where said teeth are again exposed and the measuring-chambers opened upon their inner side to the action of the seed conveyed thereto by the inclined hopper-bottom at $b$ through the opening in the inner wall, $C'$, as explained. By this construction of the shell it will be seen that the measuring-chambers are opened, first from the outer side and afterward on the inner side, in such manner as to insure their being evenly filled before they reach the discharge-outlet at $C^6$ in the outer wall of the annular groove $C^2$. Immediately over this outlet $C^6$ is arranged a pivoted yielding striker, $f$, (see Fig. 7,) which serves to remove all surplus grains from the measuring-chambers without endangering their being broken or injured.

The seeding-wheel D is made in the form of a disk upon a central hub or sleeve, $D'$, which has its bearing in the casing C, as explained. This disk is provided near its periphery with a circle of inwardly-projecting teeth, $d$, which move in the annular groove $C^2$ in the casing and form the measuring-chambers between them, and outside of said teeth the disk D has its periphery scalloped, or provided with a series of teeth or radial spurs, $d'$, upon which the pawls hereinafter described act for imparting an intermittent rotary motion to the disk or wheel and for locking the same. The disk D is perforated between the teeth $d$, the perforations $d^2$ conforming in number and shape to the spaces between the teeth $d$, inclosed by the walls of groove $C^2$, and are adapted to receive inwardly-projecting teeth or spurs $e$, formed on a second disk, E. (See Fig. 6.)

The disk D, upon its outer face, has three (more or less) series of pins or spurs, $d^3$ $d^4$ $d^5$, of different lengths, the spurs of one series being each of the same length as the corresponding spurs of the other series, and the disk E has curved slots or openings $e'$, conforming in number to the number of series of spurs on disk D, and arranged in a circle coincident in diameter with the circle in which said series of spurs on disk D are arranged. By this arrangement the disk E may be placed with its arms $E'$ between the different series of pins on disk D, with its teeth $e$ passing through the perforations $d^2$ between the teeth $d$ until the two disks rest in contact; or the disk E may be drawn out and turned relatively to disk D, for causing the arms $E'$ to rest on the shorter or longer spurs $d^3$, $d^4$, or $d^5$, thus drawing the teeth $e$ out less or more from between the teeth $d$, and thereby elongating the measuring-chambers between said teeth, or, by reversing the movement of said disk, contracting said measuring-chambers as desired. The teeth $d$ and the openings or perforations between them, as also the teeth $e$ of disk E, being of uniform size and distance apart, this adjustment is permitted, as the teeth $e$, when the disk E is withdrawn and partially rotated, freely enter the perforations $d^2$ and fill in between the teeth $d$ until the disk E is stopped by coming in contact with the adjusting-pins or the disk D itself, as explained.

The disk E has a central perforation, and is held in place by a spring, $g$, on a through-bolt, G, or upon a sleeve thereon, as shown in Fig. 4, said bolt serving also to hold the seeding-wheel united with and in proper working relation to its shell or casing, as shown. By drawing the disk E outward, overcoming the tension of the spring $g$, until the teeth $e$ are withdrawn from the perforations in disk D between the teeth $d$, said disk E can be turned as required, when the spring $g$ will draw it in and hold it firmly against the stops or spurs upon which it is desired to have it rest. In the drawings three spurs, $d^3$ $d^4$ $d^5$, are shown in each series, and these, in connection with the spaces between the series, provide for four variations in the size of the measuring-chambers, and ordinarily this number will be sufficient; but it may be increased, if desired, by increasing the number of the spurs in each series.

H represents the reciprocating rod or bar for actuating the seeding devices, and which may be operated in any usual or preferred manner. Upon each end of this bar, on its lower face, is formed or secured a short toothed rack, $H'$, (see Fig. 8,) which rests upon and engages with a toothed segment, I, secured upon the forward end of a short horizontal shaft, $I'$. The rod or bar H moves in suitable guideways, $a$, on the frame-bar A; but the arrangement is such that its weight shall rest mainly on the rocking segment I at each end, thus relieving or reducing friction. The segment I is provided with short horizontal arms $i$ $i'$, arranged about in the same horizontal plane with its shaft $I'$, as shown in Fig. 8, and to these arms are pivoted the lower ends of two upright pawls, $k$ $k'$, facing each other, as shown. These pawls are weighted on their inner adjacent sides by enlargements at $k^2$, so as to cause them to tend always to fall inward toward each other, and at their upper ends, and also about midway of their length, have spurs or teeth $k^3$ $k^4$ formed upon them, adapting them to engage and actuate the seeding-wheel D, and also to lock the same, as follows: The upright pawls $k$ $k'$ are arranged with the teeth $d'$ on the periphery of the disk or seeding wheel between them, (see Figs. 1 and 3,) and as the segment I is rocked by the reciprocating rod H, said pawls engage alternately with the wheel D, for imparting an intermittent rotary movement thereto, and in this movement of the pawls the tooth $k^3$ of one pawl, falling behind a tooth, $d'$, of wheel D, operates thereon for moving said wheel forward, and the spur $k^4$, in this upward movement of the pawl, passes within the plane of the circle of teeth $d'$ on the wheel D and locks it against any movement forward beyond what said spur $k^3$ is designed to give.

The rear end of the shaft $I'$ is provided with the segment of a beveled pinion, L, which engages with a similar segment, M, on the upper end of the vertical shaft N. (See Figs. 9, 10, and 11.) This shaft is provided with spiral or oblique wings or flanges $n$ $n'$, adapting it, in connection with its channeled casing-plates forming the seed spout or conductor P, to form the lower seed-drop referred to. By this arrangement the lower drop is operated in both directions with a positive movement and by the same shaft which actuates the seeding-wheel, and consequently its movements will be timed exactly with those of the seeding-wheel.

The devices for opening the furrow and for covering the seed dropped therein, together with all other parts of the machine not particularly described, may be constructed in any usual or preferred manner.

Having now described my invention, I claim—

1. The distributing-wheel having the laterally-projecting circle of teeth, forming the measuring-chambers between them, in combination with the casing for said wheel, adapting said measuring-chambers to be opened within the hopper upon both their outer and inner sides, to facilitate their being filled.

2. The annularly-grooved distributer-wheel casing provided with openings in its side and groove walls for giving the seed access to the distributing-wheel upon both the outer and inner faces of its toothed rim, substantially as described.

3. The toothed distributing wheel or disk provided with perforations between the teeth forming the measuring-chambers, in combination with the adjustable toothed disk or plate for adjusting the size of said measuring-chambers, substantially as described.

4. The toothed and perforated seeding-disk provided with spurs of different lengths, in combination with the toothed disk or plate, made adjustable relatively to the seeding-disk for adjusting the size of the seed-measuring chambers, substantially as described.

5. The reciprocating bar provided with the rack, in combination with the toothed segment and the weighted pawls for actuating the seeding-wheel, substantially as described.

6. The reciprocating bar H, provided with the toothed racks resting upon and vibrating the pivoted segment, and pawls actuating the seeding devices, substantially as and for the purpose described.

7. The rock-shaft through which the seeding-wheel is actuated, provided with the beveled segment for actuating the lower drop, substantially as described.

8. The rock-shaft provided with mechanism for actuating the seeding-wheel, and with the beveled segment for actuating the lower drop, in combination with the lower drop-shaft provided with a similar segment, and engaging therewith, substantially as described.

GEORGE D. HAWORTH.

Witnesses:
  THEO. COLEMAN,
  W. E. HAWORTH.